July 4, 1950     B. T. GROBOWSKI ET AL     2,513,309
LAWN MOWER

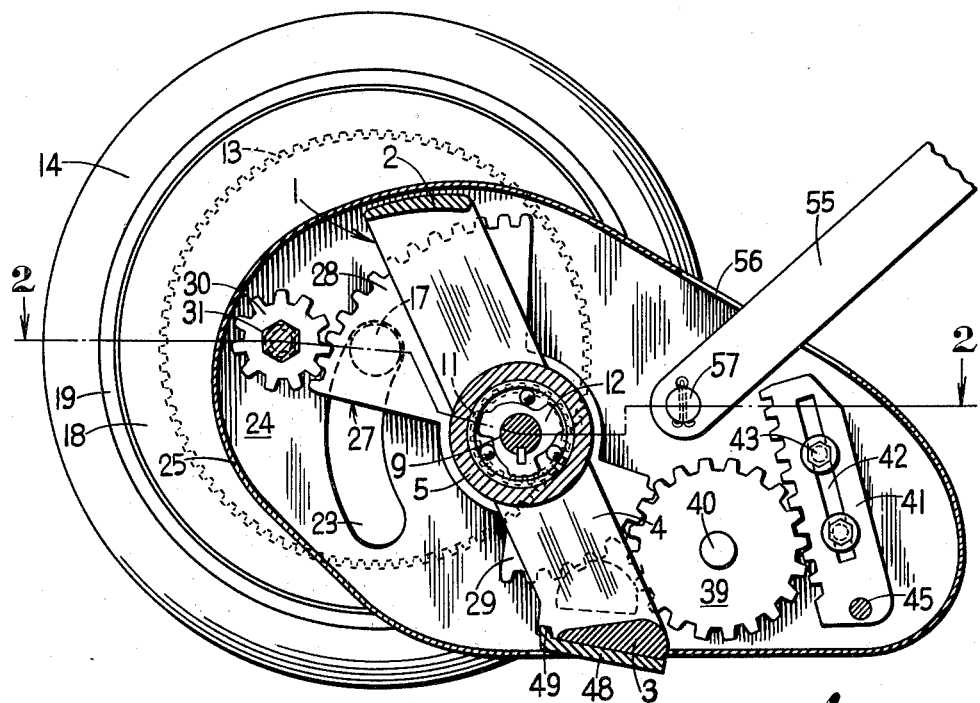
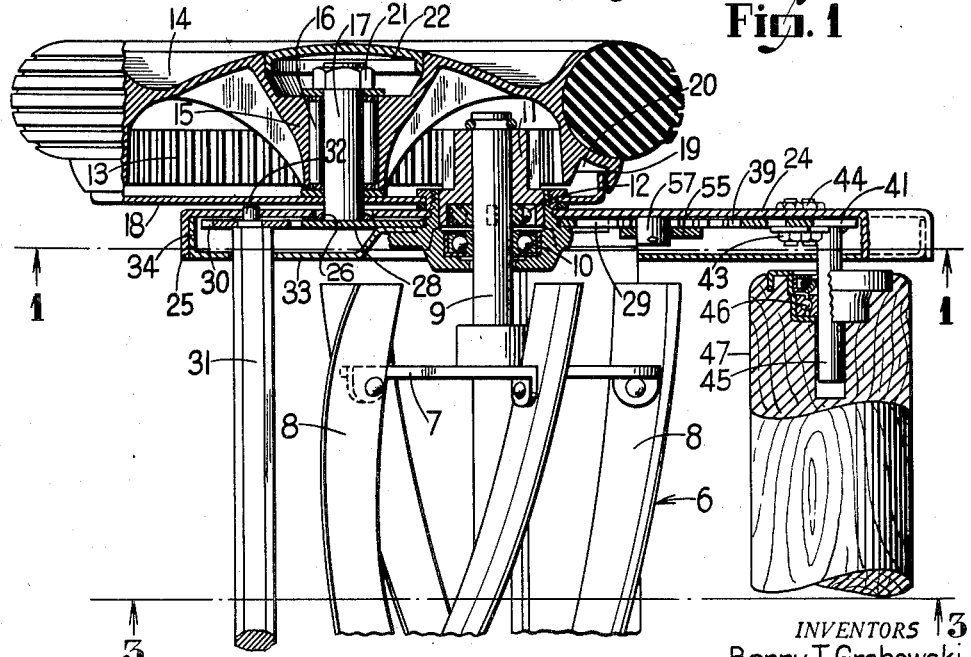
Fig. 1
Fig. 2
INVENTORS
Benny T. Grobowski.
John P. Arndt.

Filed Jan. 24, 1946     3 Sheets-Sheet 2

INVENTORS
Benny T. Grobowski.
John P. Arndt.
BY
Corbett, Mahoney & Miller
ATTORNEYS July 4, 1950 B. T. GROBOWSKI ET AL 2,513,309
LAWN MOWER
Filed Jan. 24, 1946 3 Sheets-Sheet 3

*INVENTORS*
Benny T. Grobowski.
John P. Arndt.
BY
Corbett, Mahoney + Miller
*ATTORNEYS*

Patented July 4, 1950

2,513,309

UNITED STATES PATENT OFFICE 2,513,309

LAWN MOWER

Benny T. Grobowski, Newark, and John P. Arndt, Malta, Ohio, assignors to The E. T. Rugg Company, Newark, Ohio, a corporation of Ohio Application January 24, 1946, Serial No. 643,062

3 Claims. (Cl. 56—249)

Our invention relates to a lawn mower. It has to do, more particularly, with a lawn mower of improved rugged construction which is of such a nature that the various necessary adjustments for proper operation are facilitated.

In the prior art, various and sundry lawn mower structures have been provided. One disadvantage of prior art law mower structures is that they are of such a nature that relative distortion or "springing" of the supporting frame, the cutting reel, and the cutting bar often occurs upon striking objects in the grass, such as small stones and twigs. Springing of any of these parts obviously prevents proper operation of the mower and is generally impossible to correct properly. Another disadvantage of prior art structures resides in the fact that they usually include complicated structures for adjusting the mower to vary the depth of cut and for positioning the cutter bar relative to the cutter reel. Furthermore, these adjustments are difficult to make properly and accurately with such structures. Also with prior art structures, various operating parts are not sufficiently protected from clogging by grass and dirt.

One of the objects of our invention is to provide a lawn mower of an extremely rugged construction which is of such a nature that distortion or springing of various parts, which tend to result from striking objects such as stones or twigs, will be precluded.

Another object of our invention is to provide a lawn mower wherein the cutting reel and cooperating cutter bar are both supported by the same rugged frame unit so that there will be no danger of relative displacement or distortion during operation of the mower.

Another object of our invention is to provide a lawn mower which is provided with a simple yet effective structure for quickly and easily adjusting the mower to vary the depth of cut.

Another object of our invention is to provide a simple, effective and easily operable structure in a lawn mower for adjusting the cutter bar and the cutting reel accurately relative to each other.

Still another object of our invention is to provide a lawn mower which is so constructed that the various operating parts thereof are completely and effectively protected from clogging by grass or dirt.

Various other objects will be apparent hereinafter.

In its preferred form, we provide a lawn mower in which extreme rigidity is accomplished by providing a transversely extending yoke or frame unit which supports both the cutting reel and the cutter bar in rigid association with each other. This yoke further serves to rigidly connect together, insofar as lateral movement is concerned, the side plates of the mower which, in turn, carry the supporting wheels. However, the side plates are pivotally adjustable relative to the yoke. The side plates also carry the transversely extending ground-engaging roller at a point behind the reel. The side plates have associated therewith gear arrangements for simultaneously adjusting the wheels and the ground roller vertically relative to the axis of the cutting reel in order to vary the depth of cut of the mower. The cutter bar is provided with a knife edge which may be adjusted quickly and easily relative to the cutting reel to provide the proper cutting action.

The preferred embodiment of our invention is illustrated in the accompanying drawings wherein similar characters of reference designate corresponding parts and wherein—

Figure 1 is a vertical sectional view taken through a mower constructed according to my invention and taken substantially along 1—1 of Figure 2.

Figure 2 is a horizontal sectional view taken substantially along line 2—2 of Figure 1.

Figure 3:
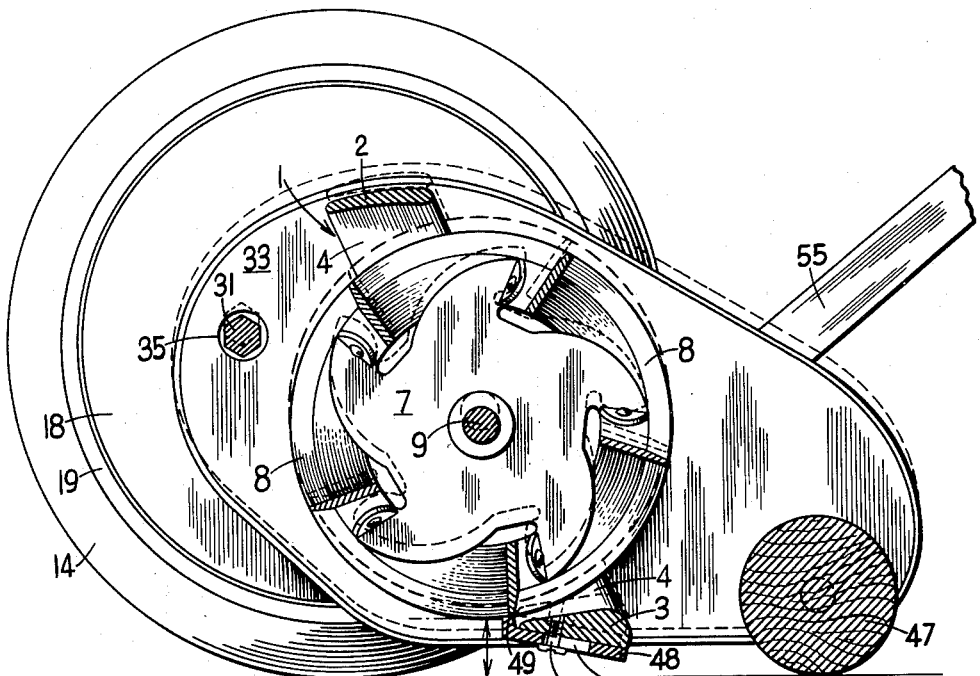
Figure 3 is a vertical sectional view taken substantially along line 3—3 of Figure 2.

With reference to the drawings, we have illustrated our lawn mower as comprising a one-piece frame unit 1 which may be termed a yoke. This yoke 1 (Figure 8) is rigidly cast in one piece and, in its preferred form, consists of a top bar 2 and a bottom cutter bar 3 which is adapted to support a knife. The bars 2 and 3 extend transversely substantially the full width of the mower and are integrally joined together by vertically extending bearing supporting arms 4 at the ends thereof. The arms 4, substantially midway of their height, have bearing cups 5 (Figure 9) cast therein and these cups have their interiors machined to properly receive the bearings.

The yoke 1 supports a cutting reel 6 which is of usual construction and which includes the spiders 7 that carry the reel cutter knives 8. The spiders 7 are carried by a shaft 9, the ends of which extend into the bearing cups 5 (Figure 2) which contain the ball bearing units 10 that rotatably support the shaft. The outer ends of the shaft 9 have driving pinions 11 loosely carried thereby. Between each pinion and the shaft within the bearing cup 5, there is provided a clutch unit 12 (Figures 1 and 2) which is of a type in common use. This clutch will serve to rotate the shaft 9 when the pinion 11 is rotated in one direction, but will not drive the shaft upon rotation of the pinion in the opposite direction.

Each of the pinions 11 is driven by means of an internal ring gear 13 (Figure 2) provided on the interior of each supporting and driving wheel 14. Each wheel 14 includs a hub 15 which carries a roller bearing 16 that surrounds the wheel axle 17. It will be apparent that each wheel 14 is hollow and the pinion 11 extends thereinto, and the axis of the pinion 11 and shaft 9 is disposed eccentric relative to the wheel axle 17. The inner side of each wheel is substantially closed by a wheel plate 18 that has an outwardly extending peripheral flange 19 that extends into an angular groove 20 formed in the inner surface of the rim of the wheel. The flange 19 and groove 20 cooperate to substantially seal the wheel and prevent dirt and grass from interfering with the operation of the meshing pinion 11 and gear 13. The wheel is maintained on the axle 17 by means of a nut 21 which is protected by a removable hub-cap 22. The pinion 11 and shaft 9 extend through an opening in plate 18 which is eccentrically located therein while the axle 17 extends through an opening at the center of the plate.

Figure 8:
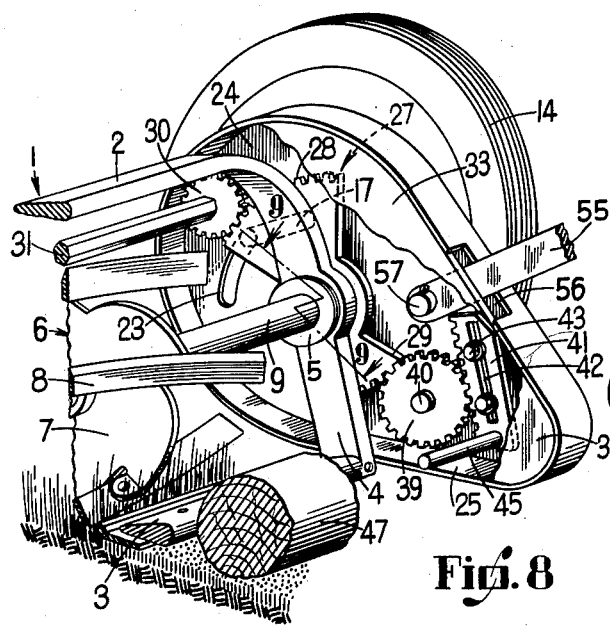
Figure 8 is an interior perspective view, partly broken away, of one end of the mower.

Each wheel axle 17 extends inwardly through an arcuate slot 23 formed adjacent the forward end (Figures 1, 2 and 8) of a vertically disposed side plate 24 which is of substantially oval form having its higher portion forward. This plate 24 is provided with an inwardly extending flange 25 around its entire periphery. The arcuate slot 23 is of considerable length and is disposed concentric with the axis of the shaft 9. The axle 17 extends through this slot and its inner end is welded, as indicated at 26 in Figure 2, to the outer surface of a double gear segment 27 which is disposed within the side plate 24. This double gear segment 27 is in the form of an arm which is rotatably supported on the bearing cup 5 and which has a gear segment 28 at the upper end thereof and a gear segment 29 at the lower end thereof, as shown in Figures 1 and 8. The segments 28 and 29 are also concentric with the shaft 9.

Each of the segments 28 engages a pinion 30 which is keyed on the end of a transversely extending bumper rod 31. This rod 31 is mainly of hexagonal cross-section but is provided with a reduced rounded bearing portion 32 at each end thereof which fits into a bearing opening formed in the side plate 24 adjacent the forward end thereof. Within the plate 24, there is provided a cover plate 33 which will protect the mechanism within the plate 24 from clogging with dirt or grass. The plate 33 is provided with a central opening so that it may be slipped over the bearing cup 5 and is further provided with an outwardly directed peripheral flange 34 which lies closely adjacent the flange 25 on the side plate 24 to provide an effective seal. The rod 31 passes through a circular opening 35 formed in the plate 33. It will be apparent that rotation of rod 31 will simultaneously rotate both of the pinions 30.

Figure 9:
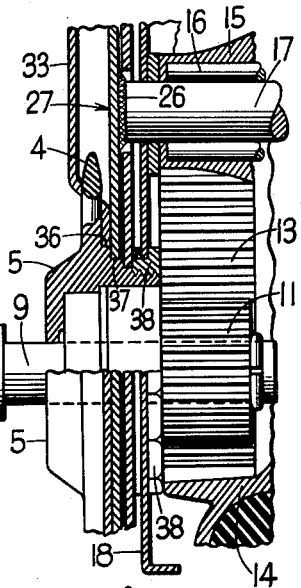
Figure 9 is a sectional view taken substantially along line 9—9 of Figure 8.

It will be noted best from Figures 2 and 9 that in assembling the structure at each side of the mower, the plate 33 is first positioned by slipping it over the outer end of the cup 5 and moving it until it rests against the ledge 36 adjacent the inner side of the cup. The double segment 27 is then similarly slipped over the cup 5 until it is positioned upon the annular shoulder 37 upon which it will rotate. The plate 24 is then slipped over the cup 5 with the axle 17 of the wheel passing through the slot 23. This plate will engage the outer surface of the shoulder 37. The wheel plate 18 is then positioned on the cup and the nut 38 is threaded on the outer end of the cup in order to clamp the plate 18 and the plate 24 tightly and non-rotatably to the cup 5 which, as previously explained, is carried by the yoke 1. The main part of the wheel will then be applied to the axle 17.

The segment 29 on the lower end of member 27 meshes with a pinion 39 (Figures 1 and 8). This pinion 39 is rotatably carried by a stud 40 which is journaled in the side plate 24 adjacent the rear end thereof. The pinion 39 meshes with a vertically slidable rack 41. The rack 41 is provided with a vertical slot 42 into which a pair of guide bolt units 43 extend. These units 43 are carried by the side plate 24 and are so arranged that the rack 41 will be tilted forwardly, as shown in Figure 1. At least one of these bolt units 43 is provided with a clamping nut 44 outside the plate 24 so that the rack can be clamped and held in any adjusted position. This, consequently, will lock the pinion 39, the double segment 27, the pinion 30, and the bumper rod 31 in a fixed position.

Each of the racks 41 carries on its lower end an inwardly projecting roller trunnion 45. Each trunnion extends into a ball bearing unit 46 which is mounted in the end of a transversely extending ground roller 47 which may be the usual wood roller. Thus, upon vertical movement of racks 41, the roller 47 will be moved vertically since the roller is carried by the racks.

Figure 4:
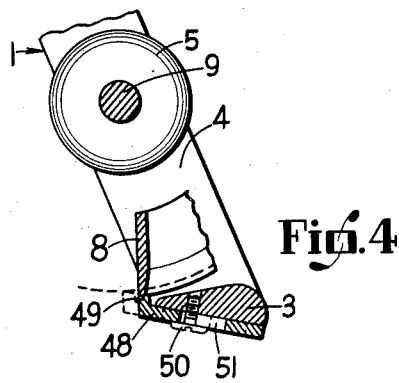
Figure 4 is a detail, in section, illustrating the adjustable mounting for the cutter bar knife on the cutter bar.
Figure 5:
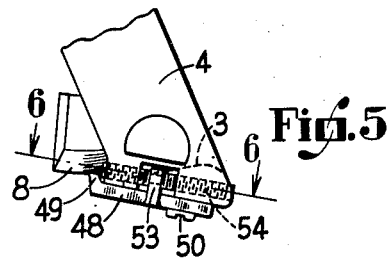
Figure 5 is an end view of the cutter bar and knife showing one of the knife adjusting screws.
Figure 6:
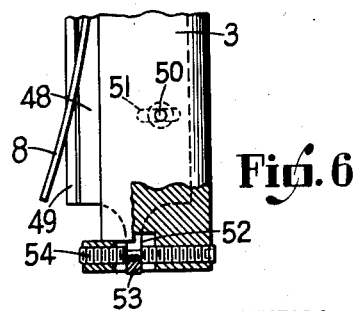
Figure 6 is a view, partly in section, taken substantially along line 6—6 of Figure 5.
Figure 7:
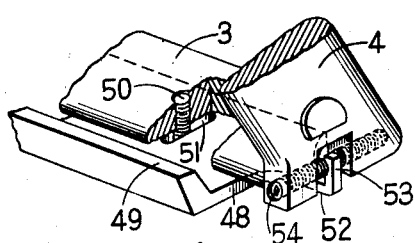
Figure 7 is a top perspective view, partly broken away, of the end of the cutter bar and knife.

The lower bar 3 of the yoke 1 adjustably supports the knife 48 for cooperation with the cutting reel 6. This structure is illustrated best in Figures 4 to 7. The knife 48 is of flat cross-section but has an upstanding shoulder 49 along its forward edge which serves to provide a shearing edge. The knife 48 is supported on the lower surface of the bar 3 by means of a plurality of longitudinally spaced screws 50 which are threaded into the lower surface of bar 3 and which extend through slots 51 extending transversely of the knife 48. It will be noted that the shoulder 49 is ahead of the bar 3. Each end of the knife 48 is provided with a reduced extension 52 which is provided with a pair of upstanding spaced lugs 53. The extension 52 is disposed within the bifurcated lower end of the arm 4 which extends below the bar 3. An adjusting screw 54 is threaded transversely through the bifurcated lower end of arm 4 and is provided with a reduced midportion which the lugs 53 straddle. The screws 50 maintain the knife 48 against the bar 3 but will not prevent relative movement of these members. By operating the screw 54 at each end of the yoke, the knife 48 may be moved forwardly or rearwardly, as indicated in Figure 4, to properly adjust the shearing edge relative to the cutting reel 6.

With the structure described above, extreme rigidity will be acquired due to the provision of the integral yoke 1. This yoke not only supports the cutting reel and the cutter bar so that they will always be in proper position relative to each other, but it also rigidly connects the side plates 24 to each other. Thus, an extremely rigid frame structure results.

In using the mower, the various parts are assembled in the manner previously described. The yoke member 1 is adjusted about the axis of the shaft 9 until the cutter bar 3 is properly positioned relative to the cutting reel 6. The knife 48 will usually be located in a position slightly behind the axis of the cutting reel or, in other words, the lower portion of the yoke 1 will be swung rearwardly behind the axis of the cutting reel. When the yoke is properly located, as indicated, the nuts 38 are tightened firmly to clamp the yoke in a fixed position.

The next adjustment is to adjust the knife 48 forwardly or rearwardly on the bar 3 to obtain a fine adjustment of the shearing edge thereof relative to the knives of the cutting reel. This may be quickly and easily accomplished merely by operating the screws 54.

In order to adjust the lawn mower to obtain the proper depth of cut, it is merely necessary to release the clamping nut 44, associated with rack 41, and rotate the bumper rod 31 with a wrench. This will simultaneously rotate both of the pinions 30. Rotation of the pinions 30 will swing the double segment member 27 around the bearing cup 5, or in other words, around the axis of the cutting reel shaft 9. Consequently, this will move the wheel axles 17 through the slots 23 or about the axis of the shaft 9. Swinging of the member 27 causes the lower segment 29 to rotate the pinion 39 which, in turn, will slide the rack 41 vertically. Thus, it will be apparent that the rack will be moved vertically in the same direction in which the wheel axles 17 are moved.

With this adjustment, upon rotation of the bumper rod 31, the two wheels 14 are simultaneously moved vertically relative to the yoke 1 and the cutting reel carried thereby and also, at the same time, the ground-engaging roller 47 is moved vertically relative thereto in the same direction. Thus, this will locate the integral yoke 1, and the various parts carried thereby, at a different height relative to the ground-engaging wheels 14 and the ground-engaging roller 47 and, consequently, will vary the depth of cut. Furthermore, this adjustment will be accomplished without disturbing the relationship of the knife 48 and the cutting reel 6. After this adjustment, the nut 44 may be tightened to lock the various parts in adjusted positions.

The handle structure for pushing the lawn mower may be attached in the manner illustrated in Figures 1 and 8. Thus, the lower arms 55 of the handle structure may pass through slots 56, formed in the flanges 25 of the side plates 24 and may be pivoted, as at 57, to the vertical surfaces of the side plates.

Figure 10:
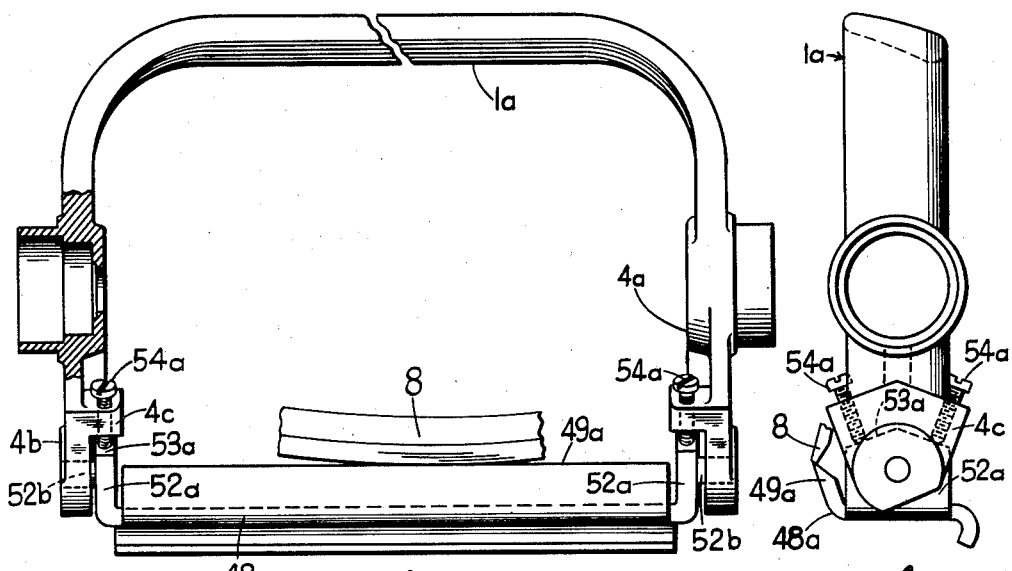
Figure 10 is a view mainly in elevation but partly in section illustrating the yoke carrying a modified cutter bar structure.
Figure 11:
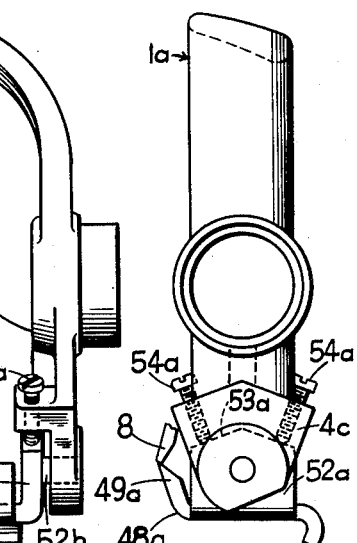
Figure 11 is an end view of the structure shown in Fig. 10.

In Figure 10, we illustrate an arrangement of a modified form of yoke structure and cutter bar structure. In this instance, the yoke 1a is made substantially the same as before with the exception that it is not provided with an integral lower transverse bar 3. The cutter bar 48a is made in one piece and is of different cross-sectional form having an integral upstanding flange 49a on its forward edge which has a sharp knife edge for cooperating with the reel knives. Each end of the cutter bar is provided with an upstanding lug 52a which carries trunnions 52b that are rotatably mounted in bearing lugs 4b formed on the lower ends of the arms 4a of the yoke. The arms 4a on their inner surfaces also are provided with inwardly extending lugs 4c through which a pair of screws 54a are threaded downwardly at converging angles. These screws engage inclined surfaces 53a formed on the upper ends of the lugs 52a.

It will be apparent that by merely adjusting the screws 54a, the cutter bar 48a will be swung about the axes of the trunnions 52b and will, consequently, provide for adjustment of the flange 49a relative to the cutting reel carried by the yoke 1a.

It will be apparent from the above description that we have provided a lawn mower structure in which distortion and misalignment of parts will be precluded even upon striking hard objects in the grass, due to the rigidity accomplished by the use of the rigid yoke structure. Furthermore, it will be apparent that the depth of cut can be varied readily with little trouble. Also, the cutter blade knife can be accurately and quickly adjusted relative to the reel knives. All operating parts, including both the adjusting mechanism within the side plates and the driving mechanism within the wheels, is completely protected from dirt and grass.

Having thus described our invention, what we claim is:

1. A mower comprising a transversely extending rigid yoke having bearing housings at each end thereof, a cutting reel having its shaft rotatably mounted in bearings in said housings, a cutter bar carried on the lower side of said yoke in association with said cutting reel and parallel to the axis thereof, side plates adjustably connected to each end of said yoke at the axis of the cutting reel, ground-engaging wheels associated with said side plates, said wheels being supported by axles which project through arcuate slots formed in said side plates, said slots being concentric with the axis of the cutting reel, a double gear segment disposed within each side plate and carrying one of said axles, said gear segment being mounted for rotation about the axis of said cutting reel, a bumper bar extending transversely and having pinions keyed thereto for engaging one pair of said segments, a rack carried by each of said side plates for vertical movement, and a pinion rotatably carried by the side plate and engaging said rack, the pinions carried by the side plates being rotated by the other pair of said segments.

2. A structure according to claim 1 wherein a knife is adjustably carried by said cutter bar so that it may be adjusted toward and from the cutting reel.

3. A mower structure according to claim 1 including a knife disposed beneath said cutter bar and being connected thereto by pin and slot connections for adjustment toward and from the cutting reel, and screws carried at each end of said bar and engaging said knife for adjustment thereof transversely relative to said bar and toward and away from the cutting reel.

BENNY T. GROBOWSKI.
JOHN P. ARNDT.

REFERENCES CITED

The following references are of record in the file of this patent:

UNITED STATES PATENTS

| Number | Name | Date |
|---|---|---|
| 2,061,003 | Nelson | Nov. 17, 1936 |

FOREIGN PATENTS

| Number | Country | Date |
|---|---|---|
| 5,095 | Great Britain | 1888 |
| 18,347 | Great Britain | 1889 |
| 113,287 | Australia | June 9, 1941 |
| 557,449 | Great Britain | Nov. 22, 1943 |